United States Patent
Kojima

[11] Patent Number: 6,126,544
[45] Date of Patent: Oct. 3, 2000

[54] VIDEO GAME MACHINE, MACHINE READABLE STORAGE MEDIUM STORING A COMPUTER PROGRAM, AND EVENT SELECTION METHOD IN THE VIDEO GAME MACHINE

[75] Inventor: Hideo Kojima, Tokyo, Japan

[73] Assignee: Konami Co., Ltd., Hyogo-ken, Japan

[21] Appl. No.: 09/114,540

[22] Filed: Jul. 13, 1998

[30] Foreign Application Priority Data

Jul. 16, 1997 [JP] Japan ..................................... 9-191584

[51] Int. Cl.[7] ....................................................... A63F 9/24
[52] U.S. Cl. ................................ 463/31; 273/236; 463/43
[58] Field of Search ................................ 463/30–32, 42, 463/40–41, 43, 44; 273/236, 250, 251, 252, 253, 254, 255, 266

[56] References Cited

U.S. PATENT DOCUMENTS

| 5,273,294 | 12/1993 | Amanai | 463/43 |
|---|---|---|---|
| 5,489,103 | 2/1996 | Okamoto | 463/43 |
| 5,649,862 | 7/1997 | Sakaguchi et al. | 463/44 |
| 5,752,883 | 5/1998 | Butcher et al. | 463/43 |
| 5,954,332 | 9/1999 | Mero et al. | 273/236 |

*Primary Examiner*—Valencia Martin-Wallace
*Assistant Examiner*—Shela Clayton
*Attorney, Agent, or Firm*—Jordan and Hamburg LLP

[57] ABSTRACT

A video game machine presents an attractive game that even those people who do not have enough time can enjoy. A CPU of the video game machine specifies one of a plurality of events related to the ending of a story in a game world. The CPU then determines whether the specified event is allowed to be skipped on the basis of a skip flag stored in a state management table. In the case where the CPU determines that the event is allowed to be skipped, if an event skip signal is input via a controller, then the CPU skips the presentation of that event and presents a bridge pattern instead of the skipped event. The skipping of the event results in the number of events related to the ending of the story and thus the time spent by the game player to reach the ending of the story.

19 Claims, 10 Drawing Sheets

FIG. 2

| | EVENT NO. | SKIP | CONTENTS OF EVENTS | NUMBER OF EVENTS REQUIRED TO CLEAR |
|---|---|---|---|---|
| START OF THE GAME | P | NOT ALLOWED | PROLOGUE | |
| STEP A | a1 | ALLOWED | GET A GOLD BALL | 3 |
| | a2 | ALLOWED | GET A SILVER BALL | |
| | a3 | ALLOWED | GET A COPPER BALL | |
| | a4 | ALLOWED | GET A TIN BALL | |
| | a5 | ALLOWED | IN EXCHANGE FOR A BALL, GET KNOWLEDGE OF HOW TO OBTAIN AN ARMOR | |
| | N1 | NOT ALLOWED | GET AN ARMOR | |
| STEP B | b1 | ALLOWED | SEARCH A CAVE FOR A RING | 3 |
| | b2 | ALLOWED | LOOK FOR A MERCHANT WHO WANTS THE RING | |
| | b3 | ALLOWED | GET A BOOK FROM THE MERCHANT IN EXCHANGE FOR THE RING | |
| | b4 | ALLOWED | INTERPRET THE CONTENTS OF THE BOOK | |
| | b5 | ALLOWED | GET THE GOLD KEY DESCRIBED IN THE BOOK | |
| | N2 | NOT ALLOWED | OPEN A TREASURE BOX WITH THE GOLD KEY AND GET A HELMET | |
| STEP C | c1 | ALLOWED | FIGHT AGAINST A SOLDIER A | 3 |
| | c2 | ALLOWED | FIGHT AGAINST A SOLDIER B | |
| | c3 | ALLOWED | FIGHT AGAINST A SOLDIER C | |
| | c4 | ALLOWED | FIGHT AGAINST A SOLDIER D | |
| | c5 | ALLOWED | FIGHT AGAINST A SOLDIER E | |
| | N3 | NOT ALLOWED | FIGHT AGAINST A SOLDIER F AND GET A SWORD | |
| STEP D | d1 | ALLOWED | HELP BUILD A BRIDGE IN A VILLAGE | |
| | d2 | ALLOWED | GO ACROSS THE BRIDGE AND SEARCH FOR A VILLAGE | |
| | d3 | ALLOWED | GET RID OF MONSTERS LIVING IN THE VAILLAGE AND OBTAIN A MAP | |
| | d4 | ALLOWED | GET A SHIP | |
| | d5 | ALLOWED | HIRE SAILORS AND GO TO AN ISLAND SHOWN IN THE MAP | |
| | N4 | NOT ALLOWED | FIGHT AGAINST THE BOSS OF THE MONSTERS ON THE ISLAND | |
| END OF THE GAME | E | NOT ALLOWED | ENDING | |

| EVENT | SKIP FLAG | CLEARED EVENT RATIO(%) | MINIMUM CLEARED EVENT RATIO(%) REQUIRED TO SKIP THE EVENT | CORRESPONDING BRIDGE PATTERN |
|---|---|---|---|---|
| P | 1 | — | — | — |
| a1 | 0 | 4.17 | 0 | Br1 |
| a2 | 0 | 4.17 | 0 | Br2 |
| a3 | 0 | 4.17 | 4.17 | Br3 |
| a4 | 0 | 4.17 | 8.34 | Br4 |
| a5 | 0 | 4.17 | 12.51 | Br5 |
| N1 | 1 | 4.17 | — | — |
| ⋮ | ⋮ | ⋮ | ⋮ | ⋮ |
| b5 | 0 | 4.17 | 29.19 | Br10 |
| N2 | 1 | 4.17 | — | — |
| ⋮ | ⋮ | ⋮ | ⋮ | ⋮ |
| c5 | 0 | 4.17 | 45.87 | Br15 |
| N3 | 1 | 4.17 | — | — |
| ⋮ | ⋮ | ⋮ | ⋮ | ⋮ |
| d1 | 0 | 4.17 | 66.82 | Br16 |
| d2 | 0 | 4.17 | 66.82 | Br17 |
| d3 | 0 | 4.17 | 66.82 | Br18 |
| d4 | 0 | 4.17 | 66.82 | Br19 |
| d5 | 0 | 4.17 | — | Br20 |
| N4 | 1 | 4.17 | — | — |
| E | 1 | — | — | — |

FIG. 9B

| EVENT | SKIP FLAG | TOTAL CLEARED EVENT RATIO |
|---|---|---|
|  |  |  |

FIG. 10

VIDEO GAME MACHINE, MACHINE READABLE STORAGE MEDIUM STORING A COMPUTER PROGRAM, AND EVENT SELECTION METHOD IN THE VIDEO GAME MACHINE

BACKGROUND OF THE INVENTION

1. Field of the Invention

The present invention relates to a video game machine for executing a role-playing game (RPG) in which a game player can develop a story in a game world toward its ending via a principal character appearing in the story, and also to a machine readable storage medium storing a computer program executed by the video game machine.

2. Description of the Related Art

A video game machine for executing a role-playing game (hereinafter referred to as an RPG) is known in the art. The RPG refers to a game in which a game player enjoys developing a story by operating a principal character in a virtual game world provided by a video game machine.

In the RPG, the story in the game world provided by the video game machine generally consists of a prologue, a plurality of events (episodes), and an ending. When the RPG is started, the video game machine first presents a prologue image and then a plurality of events to the game player. The game player tries to clear the events by operating the principal character and thus the story is developed in the game world. If the game player clears the last event provided by the vide game machine, the video game machine presents an ending image on the screen and thus the RPG is complete.

The conventional RPG video game machine has the following problem. That is, it is required that the game player should clear all events presented by the game machine otherwise the story cannot reach the ending in the game world. In some video game machines, the RPG includes not only such events which are related to the ending of the story but also events independent of the ending. In this case, although it is not required to clear all events, it is still required to entirely clear the events which are related to the ending of the story to reach the ending.

As a result, as long a time as a few ten hours is needed for the game player to reach the ending of the story in the game world. Although school pupil and university students may have enough time, general people having jobs do not have enough time to enjoy the role-playing game.

In view of the above, it is an object of the present invention to provide a video game machine capable of providing a game that many game players including those whose do not have enough time can enjoy. It is another object of the present invention to provide a machine readable storage medium storing a computer program for use by such a video game machine.

SUMMARY OF THE INVENTION

According to an aspect of the present invention, there is provided a video game machine for presenting a plurality of events, which form a story in a game world and which are related to its ending, to a game player so that the game player can develop the story toward its ending via clearing the events by means of operating a character appearing in the story, the video game machine comprising: event data storage means for storing the plurality of data each of which corresponds to one of the plurality of events respectively; specifying means for specifying one of the plurality of events; judgment means for reading the data of the event specified by the specifying means from the event data storage means and judging whether the event is allowed to be skipped or not on the basis of the data of the event; and event cancel means for canceling the presentation of the event to the game player in response to an input of an event skip signal, provided that the judgement means has judged that the event is allowed to be skipped.

In the video game machine according to the invention, the specifying means specifies one of the plurality of events which form the story in the game world and which are related to the ending of the story. The judgement means then judges whether the specified event is allowed to be skipped on the basis of the data associated with the event. In the case where the event is allowed to be skipped, if an event skip signal is input, then the event cancel means cancels the presentation of that event to the game player. This results in a reduction in the number of events related to the ending of the story and presented to the game player, thus a reduction in the time spent by the game player to reach the ending of the story.

According to another aspect of the present invention, there is provided a video game machine for presenting a plurality of events, which form a story in a game world and which are related to its ending, to a game player one by one in a predetermined presentation order so that the game player can develop the story toward its ending via clearing the events by means of operating a character appearing in the story, the video game machine comprising: event data storage means for storing the plurality of data each of which corresponds to one of the plurality of events respectively; specifying means for specifying one of the plurality of events in accordance with the predetermined presentation order; judgment means for reading the data of the event specified by the specifying means from the event data storage means and judging whether the event is allowed to be skipped or not on the basis of the data of the event to the game player; and event cancel means for canceling the presentation of the event in response to an input of an event skip signal, provided that the judgment means has judged that the event is allowed to be skipped.

In the video game machine according to either aspect described above, the video game machine may further comprise cleared event ratio storage means for storing cleared event ratio data indicating how many of the plurality of events have been cleared, and in response to the event skip signal, the event cancel means cancels the presentation of the event judged by the judgement means as being allowed to be skipped, provided that the cleared event ratio data stored in the cleared event ratio storage means is greater than a predetermined threshold value.

Furthermore, the video game machine may further comprise connection event presentation means for presenting a connection event when the presentation of an event is canceled by the event cancel means, so that the event immediately prior to the canceled event is connected to the event immediately following the canceled event via the connection event thereby preventing a contradiction etc. from occurring which would otherwise occur due to the cancel of the event.

The video game machine may further comprise threshold value storage means for storing the plurality of threshold values each of which corresponds to one of the plurality of events respectively wherein in response to the event skip signal, the event cancel means cancels the presentation of the event judged by the judgement means as being allowed to be skipped, based on the threshold value stored in the threshold value storage means.

Preferably, the threshold values stored in the threshold value storage means may be determined in accordance with the event presentation order.

Furthermore, the data of the plurality of events stored in the event data storage means may preferably include skip permission data indicating whether the events are allowed to be skipped or not, and the judgement means may judge whether the event is allowed to be skipped on the basis of the skip permission data.

The above-described skip permission data may be determined in accordance with the event presentation order.

According to still another aspect of the invention, there is provided a machine readable storage medium storing a computer program for use by a video game machine to present a plurality of events, which form a story in a game world and which are related to its ending, to a game player so that the game player can develop the story toward its ending via clearing the events by means of operating a character appearing in the story, the computer program being adapted to make a computer execute the process comprising the steps of: reading one of a plurality of data each of which corresponds to one of the plurality of events respectively; determining whether the event is allowed to be skipped on the basis of the data of the event; and, in response to an input of event skip signal, canceling the presentation of said event to the game player, provided that the event has been determined to be allowed to be skipped.

Various types of storage medium may be employed as the storage medium described above. They include a ROM, a RAM, a CD-ROM, a floppy disk, a hard disk, a magneto-optical disk, and an optical disk.

According to still another aspect of the invention, there is provided a machine readable storage medium storing a computer program for use by a video game machine to present a plurality of events, which form a story in a game world and which are related to its ending, to a game player one by one in a predetermined presentation order so that the game player can develop the story toward its ending via clearing the events by means of operating a character appearing in the story, the computer program being adapted to make a computer execute the process comprising the steps of: specifying one of the plurality of events in accordance with the predetermined presentation order and reading the data which corresponds to the specified event; determining whether the specified event is allowed to be skipped on the basis of the data of the specified event; and in response to an input of an event skip signal, canceling the presentation of the event to the game player, provided that the specified event has been determined to be allowed to be skipped.

The program stored in the above-described storage medium may further comprise the steps of reading cleared event ratio data indicating how many of the plurality of events have been cleared; reading the threshold value corresponding to the specified event; and comparing the cleared event ratio data to the threshold value, wherein in the event canceling step the presentation of the event is canceled in response to an input of an event skip signal, provided that the event has been determined to be allowed to be skipped, and provided that the cleared event ratio data is greater than the threshold value.

Preferably, the program stored in the storage medium further comprises the step of presenting a connection event when the presentation of an event is canceled so that the event immediately prior to the canceled event is connected to the event immediately following the canceled event via the connection event.

According to still another aspect of the invention, there is provided a method of selecting an event in a video game machine for presenting a plurality of events, which form a story in a game world and which are related to its ending, to a game player so that said game player can develop the story toward its ending via clearing the events by means of operating a character appearing in the story, the method comprising the steps of: reading one of a plurality of data each of which corresponds to one of the plurality of events respectively; determining whether the event is allowed to be skipped on the basis of the data of the event; and, in response to an input of an event skip signal, canceling the presentation of the event to the game player, provided that the event has been determined to be allowed to be skipped.

According to still another aspect of the invention, there is provided a method of selecting an event in a video game machine for presenting a plurality of events, which form a story in a game world and which are related to its ending, to a game player one by one in a predetermined presentation order so that the game player can develop the story toward its ending via clearing the events by means of operating a character appearing in the story, the method comprising the steps of: specifying one of the plurality of events in accordance with the predetermined presentation order and reading the data which corresponds to the specified event; determining whether the specified event is allowed to be skipped on the basis of the data of the event; and canceling the presentation of the event to the game player in response to an event skip signal, provided that the specified event has been determined to be allowed to be skipped.

The method may further comprise the steps of reading cleared event ratio data indicating how many of the plurality of events have been cleared; reading the threshold value corresponding to the specified event; and comparing the cleared event ratio data to the threshold value, wherein in the event canceling step the presentation of the event is canceled in response to an input of an event skip signal, provided that the event has been determined to be allowed to be skipped, and provided that the cleared event ratio data is greater than the threshold value.

Furthermore, the method may further comprise the step of presenting a connection event when the presentation of an event is canceled so that the event immediately prior to the canceled event is connected to the event immediately following the canceled event via the connection event.

DESCRIPTION OF THE PREFERRED EMBODIMENTS

The present invention is described in further detail below with reference to preferred embodiments in conjunction with the accompanying drawings.

Construction of the Video Game Machine

Figure 1:
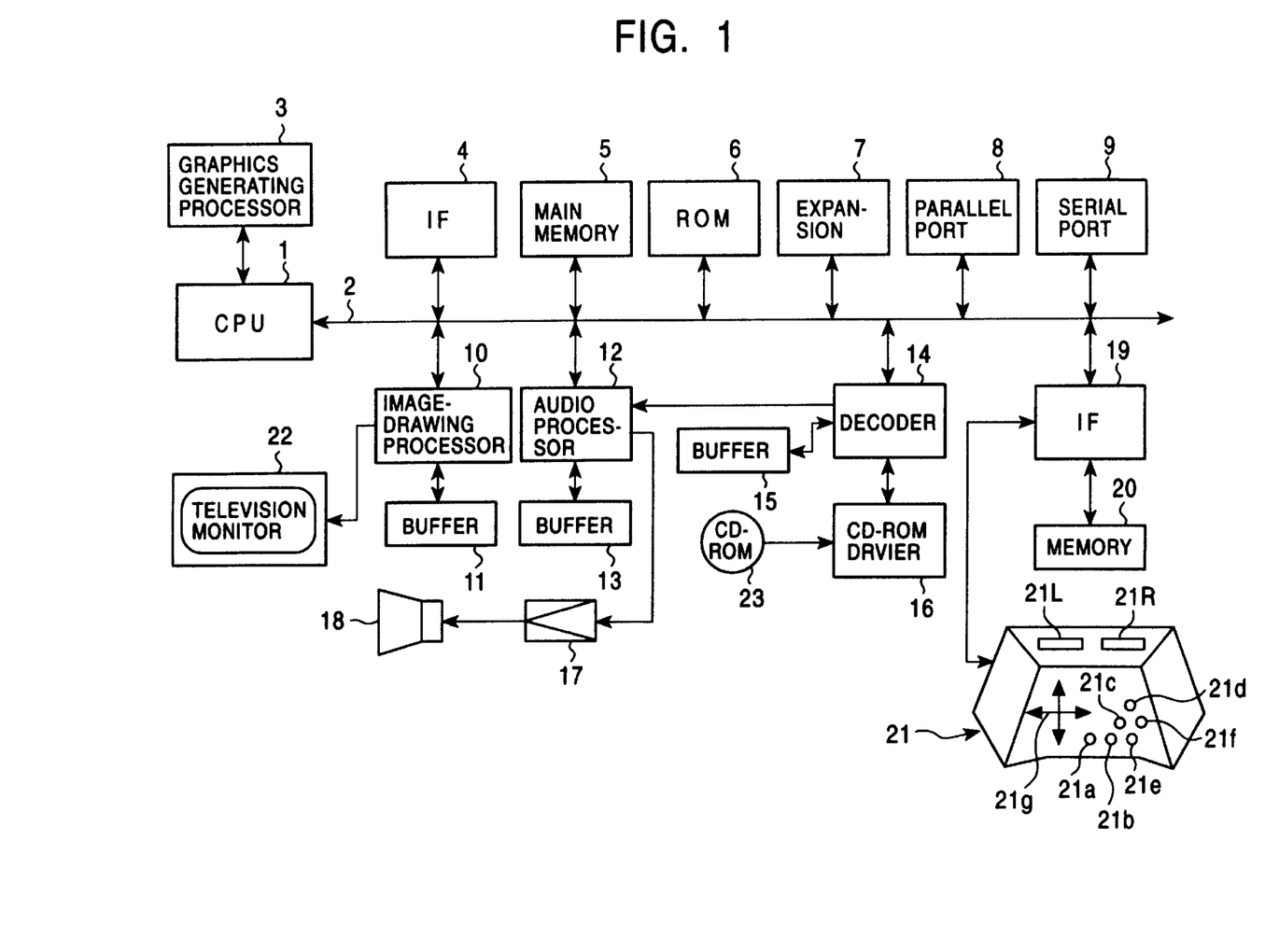
FIG. 1 is a block diagram of an embodiment of a video game machine according to the present invention.

First, the construction of a video game machine according to an embodiment of the invention is described. FIG. 1 is a block diagram illustrating the general construction of the video game machine. In FIG. 1, the video game machine includes a main part and a controller 21. A CD-ROM 23 serving as a machine readable storage medium on which image data, audio data, and a game program are stored is loaded on the main part. Furthermore, the main part is connected to a monitor 22.

The main part includes a CPU 1, a graphics data generation processor 3 connected directly to the CPU 1, an interface circuit 4, a main memory 5, a ROM 6, an expansion circuit 7, a parallel port 8, a serial port 9, an image drawing processor 10, an audio signal processor 12, a decoder 14, an interface circuit 19, a buffer 11 connected to the image drawing processor 10, a buffer 13 and an amplifier 17 connected to the audio signal processor 12, a loudspeaker 18 connected to the amplifier 17, a buffer 15 and a CD-ROM driver 16 connected to the decoder 14, and a memory 20 connected to the interface circuit 19, wherein the interface circuit 4, the main memory 5, the ROM 6, the expansion circuit 6, the parallel port 8, the serial port 9, the image drawing processor 10, the audio signal processor 12, the decoder 14, and the interface circuit 19 are connected to the CPU 1 via a bus (an address bus, a data bus, and a control bus) 2. The controller 21 described above is connected to the interface circuit 19, and the monitor 22 is connected to the image drawing processor 10.

The graphics data generation processor 3 serves as a coprocessor for the CPU 1. This graphics data generation processor 3 performs in parallel various calculations such as coordinate transformation, calculation of a light source, a calculation of a matrix or vector including for example fixed decimal point notation. Herein, the coordinate transformation is the process of determining addresses in the display area of an image to be processed in accordance with the coordinate data in terms of the respective vertices of the image to be processed in a two- or three dimensional plane, the data representing the amount of movement of the respective vertices, and the data representing the amount of rotation of the respective vertices, and then returning the resultant addresses to the CPU 1. The calculation of the light source is the process of determining the lightness of the image in accordance with the vector data of a light array, the normal data representing the orientations of surfaces of polygons, and the data representing the colors of the surfaces.

The interface circuit 4 is a circuit serving to interface with a peripheral device for example a pointing device such as a mouse or a track ball. The ROM 6 stores program data serving as the operation system of the main part of the game machine. This operating system corresponds to a BIOS (Basic Input Output System) of a personal computer. The main memory 5 is used as a memory in which a game program and various data are loaded from the CD-ROM 23.

The expansion circuit 7 performs an expansion process on a compressed image compressed by means of intra coding in accordance with the MPEG (Moving Picture Expert Group) or JPEG (Joint Photographic Expert Group) standard. The expansion process includes a decoding process (decoding data encoded according to the VLC (Variable Length Coding) method, an inverse quantization process, an IDCT (Inverse Discrete Cosine Transform) process, a reproducing process of an intra image, etc.

The image drawing processor 10 writes image data into the buffer 11 in accordance with a drawing command issued by the CPU 1. The buffer 11 consists of the display area described above and a non-display area. The display area is an area in which the data representing the image to be displayed on the television monitor 22 is written. On the other hand, the non-display area is used to store other data such as texture data, color palette data, etc. Herein the texture data is two-dimensional image data, and the color palette data specifies the color of the texture data. The texture data and the color palette data are read by the CPU 1 from the CD-ROM 23 once or a plurality of times depending on the varying game situation, and stored in the non-display area of the buffer 11.

The drawing commands include a command for drawing a line, a command for drawing a three-dimensional object with polygons, a command for drawing a two-dimensional image, etc. Herein, the polygon is a two-dimensional image having a polygonal form defined by vertices. An object displayed in a pseudo three-dimensional fashion on the screen of the television monitor 22 is usually formed of a plurality of polygons.

The drawing command to draw a line consists of the data representing the address of the staring and ending points of the line, the data representing the color, and the data indicating that the command is a line drawing command. The line drawing command is issued by the CPU 1 directly to the image drawing processor 10.

The drawing command to draw a three-dimensional object with polygons consists of polygon vertex address data representing the address in the display area of the buffer 11 for each vertex of polygons forming the object, texture address data representing the storage location in the non-display area of the buffer 11 for the texture data to be mapped to the polygons, color palette address data representing the storage location in the non-display area of the buffer 11 for the color palette data representing the color of the texture data, and lightness data representing the lightness of the texture. The polygon vertex address data is coordinate data generated by the graphics data generation processor 3 by performing coordinate transformation on the data which is received from the CPU 1 and which represents the absolute coordinates of the vertices of polygons in the virtual three-dimensional space wherein the coordinate transformation is performed on the basis of the movement data and the rotation data received from the CPU 1.

The drawing command to draw a two-dimensional image consists of vertex address data, texture address data, color palette address data, and lightness data representing lightness of texture. The vertex address data is coordinate data generated by the graphics data generation processor 3 by performing coordinate transformation on the vertex plane-coordinate data received from the CPU 1 in accordance with the movement data received from the CPU 1.

The audio signal processor 12 converts the PCM audio data read from the CD-ROM 23 into ADPCM data. The ADPCM data processed by the audio signal processor 12 is output from the loudspeaker 18 as a voice or sound.

The CD-ROM driver 16 reads data such as a game program, map data, image data, and audio data from the CD-ROM 23, and supplies the obtained data to the decoder 14.

The decoder 14 performs an error correction process on the reproduced data received from the CD-ROM driver 16 on the basis of the ECC (Error Correction Code). The resultant data is supplied to the main memory 5 or the audio signal processor 12.

The memory 20 is a card type memory used to store various parameters during a period in which a game is paused so as to maintain the state of the game.

The controller 21 includes a cross key 21g consisting of a left key, a right key, an upper key, and a lower key, formed in an integral fashion. The controller 21 further includes a left button 21L, a right button 21R, a start button 21a, a select button 21b, and first to fourth buttons 21c–21f. The cross key 21g is used by the game player to issue a command to the CPU 1 to indicate the direction to right, left, up, or down.

The start button 21a is a key used by the game player to issue a command to the CPU 1 to start execution of the game program loaded from the CD-ROM 23. The selection button 21b is a key used by the game player to give a command to the CPU 1 to perform various selections associated with the game program loaded in the main memory 5. The functions of the left button 21L, the right button 21R, and the first to fourth buttons 21c–21f vary depending on the game program loaded from the CD-ROM 23.

The outline of the operation of the video game machine is described below. When the CD-ROM 23 is loaded in the main part of the game machine, if the electric power of the main part of the game machine is turned on, the CPU 1 issues a command to the CD-ROM driver 16 to read image data, audio data, a game program, and other various data from the CD-ROM 23 according to the operation system stored in the ROM 6. In response to this command, the CD-ROM driver 16 reads data such as image data, audio data, and game program data from the CD-ROM 23, and supplies the obtained data to the decoder 14. The decoder 14 performs an error correction process on the received data such as image data, audio data, and game program, etc.

After completion of the error correction process performed by the decoder 14, the image data is supplied to the expansion circuit 7 via the bus 2. The expansion circuit 7 performs expansion processing on the received image data, and supplies the resultant image data to the image drawing processor 10 via the bus 2. The image drawing processor 10 writes the received image data in the non-display area of the buffer 11. On the other hand, the audio data subjected to error correction process via the decoder 14 is supplied to the main memory 5 or the audio signal processor 12 via the bus 2, and written in the main memory 5 or the buffer 13. The game program subjected to error correction process via the decoder 14 is supplied to the main memory 5 via the bus 2 and written in the main memory 5.

After that, the CPU 1 makes the game proceed in accordance with the game program stored in the main memory 5 and instructions given by the game player via the controller 21. That is, the CPU 1 properly controls the image processing, the audio signal processing, and internal processing in accordance with the contents of the instructions given by the game program or the game player. Herein the control of the image processing includes for example issuing a coordinate transformation command or a light source calculation command to the graphics data generation processor 3 and issuing various drawing commands to the image drawing processor 10. The control of the audio signal processing includes for example issuing a voice/sound output command to the audio signal processor 12 and specifying various conditions in terms of the signal level, reverberation, etc. The control of the internal processing is for example the control of calculations depending on the operation of the controller 21.

As an example of the control of the image processing, the operation of displaying an image of a three-dimensional object composed of polygons on the television monitor 22 is described below. Prior to displaying such an image, a table storing the absolute coordinate data of the polygons forming the object, the rotation data of the object, and the movement data of the object is created in the main memory 5. Furthermore, a table storing the texture address data and the color palette address data is created in the main memory 5.

The CPU 1 reads the data of rotation of the object, the data of movement of the object, and the data of absolute coordinates of polygons from the above-described table, and transfers the data to the graphics data generation processor 3. The graphics data generation processor 3 transforms the data of absolute coordinates of polygons to polygon vertex address data in accordance with the received data representing the rotation and the movement of the object. The graphics data generation processor 3 transfers the generated polygon vertex address data to the CPU 1.

After that, the CPU 1 reads the texture address data and the color palette address data from the above-described table, and transfers these data together with the polygon vertex address data to the image drawing processor 10.

In accordance with the polygon vertex address data, the image drawing processor 10 defines the polygon surface area (the area surrounded by lines extending from one vertex to another of the polygon) in the display area of the buffer 11. Furthermore, the image drawing processor 10 reads, from the non-display area of the buffer 11, the texture data and the color palette data corresponding to the polygon vertex address data in accordance with the texture address data and the color palette address data. The image drawing processor 10 then writes the obtained drawing data within the polygon surface area defined. This process is generally called "mapping of a texture" or "texture mapping." Thus, the display image data of the object is stored in the display area of the buffer 11. The image drawing processor 10 outputs the contents (display image data) stored in the display area of the buffer 11 to the television monitor 22.

Contents of the RPG

As described above, the game program, image data, audio data, etc. used by the video game machine to execute the role-playing game (RPG) are stored in the CD-ROM 23. The CPU 1 of the video game machine executes the RPG by executing the game program. The outline of the RPG according to the present embodiment is described below.

When the CPU 1 of the video game machine executes the game program, the game world of the RPG (refer to the maps shown in FIGS. 7 and 8) is displayed on the television monitor 22, and the principal character S of the story (refer to FIG. 7) appears in this game world. The principal character S moves within the map in response to the operation of the controller 21 performed by the game player. As the principal character S moves in the map, the principal character S encounters various events. The game player can develop his/her own story by clearing, via the principal character S, these events encountered in the game world.

Figure 2:
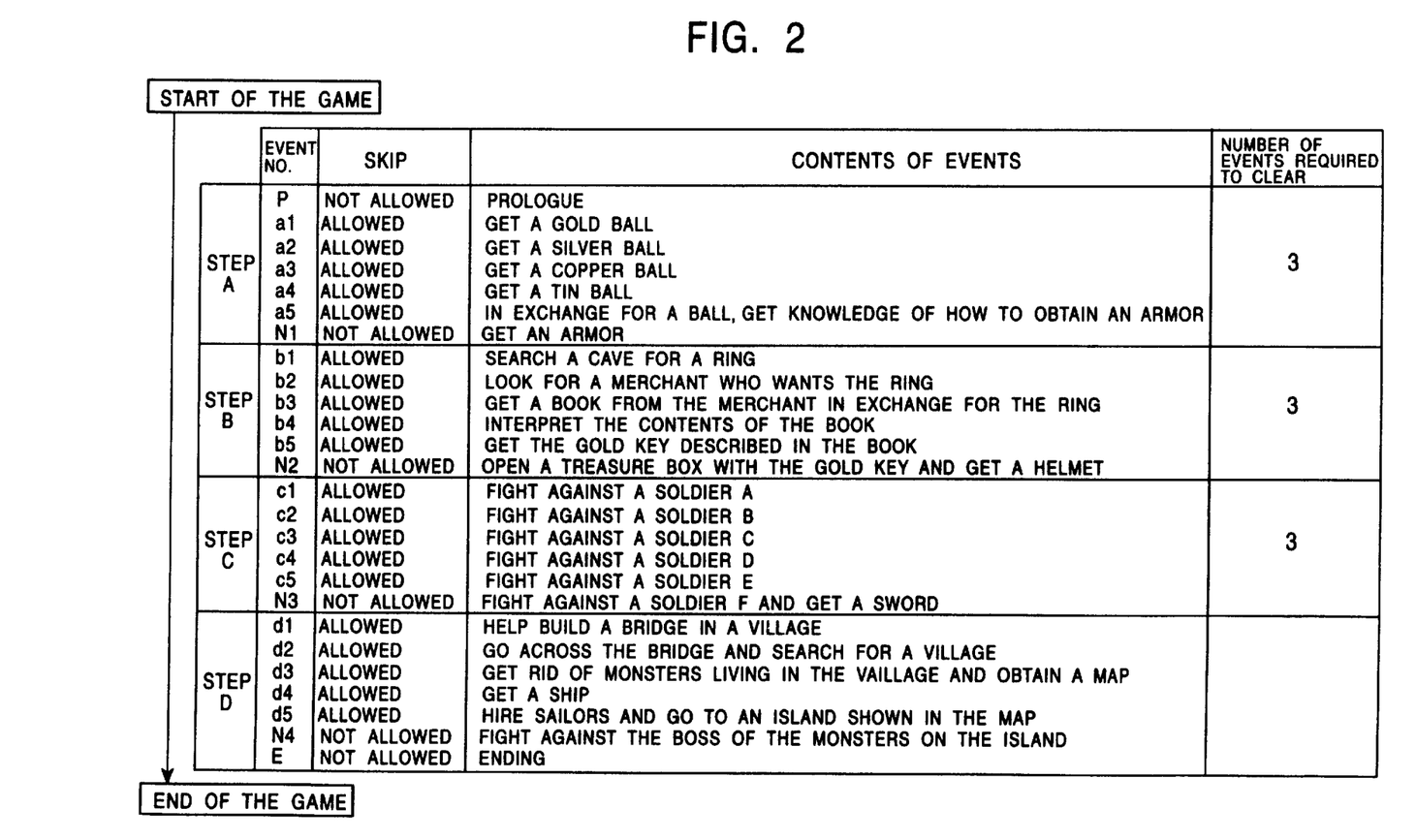
FIG. 2 is a schematic representation of a role-playing game.

FIG. 2 is a diagram representing the outline of the story developed in the RPG. This story starts from a scene where the principal character leaves his hometown and ends when the principal character conquers the boss of monsters living on a certain island. As shown in FIG. 2, the story consists of a prologue, chapters or steps A–D, and an ending (epilogue).

The respective steps A–D are independent of each other, and each step consists of six events which are related to the ending. More specifically, the step A consists of events a1–a5 and an event N1, the step B consists of events b1–b5 and an event N2, the step C consists of events c1–c5 and an event N3, and the step D consists of events d1–d5 and an event N4.

When the video game machine starts the RPG, the event P, that is, the prologue, is first presented to the game player. Next, the story proceeds to the step A, and the event a1 is presented to the game player. If the game player clears the event a1 by properly operating the principal character, the video game machine presents the next event a2 to the game player.

As described above, the video game machine presents one (single) event to the game player, and the game player tries to clear the given event. The story proceeds toward the ending as the game player clears events one by one. During the game, events in steps A–D are presented to the game player in the order from top to down in FIG. 2. When the game player clears the event N4, the ending event E is presented by the video game machine, and thus the RPG is complete.

Of the plurality of events in steps A–D described above, any of events a1–a5, b1–b5, c1–c5, and d1–d5 can be skipped according to the choice by the game player. In contrast, events N1–N4 are important episodes in the story, and thus they are not allowed to be skipped.

However, the game player is required to clear 70% or more of events in steps A–D to reach the ending of the story. That is, it is required to clear 17 or more of 24 events in steps A–D. Furthermore, it is also required to clear 3 or more of skippable events in each step A–D to proceed to the next step.

In the case where an event is skipped in accordance with choice made by the game player, the episode associated with the skipped event is not included in the story of the game world. However, some events are assumed to have a particular event immediately prior to them. If the particular event assumed to be prior to some event is skipped, the following event becomes impossible to clear or a contradiction occurs in the story. In view of the above, there are provided special events called "bridge patterns" which are used instead of skipped events. That is, if some event is skipped, a proper one of the bridge patterns is presented instead of the skipped event so that the story proceeds to the event immediately following the skipped event without encountering any contradiction or trouble in proceeding the game.

Figure 3:
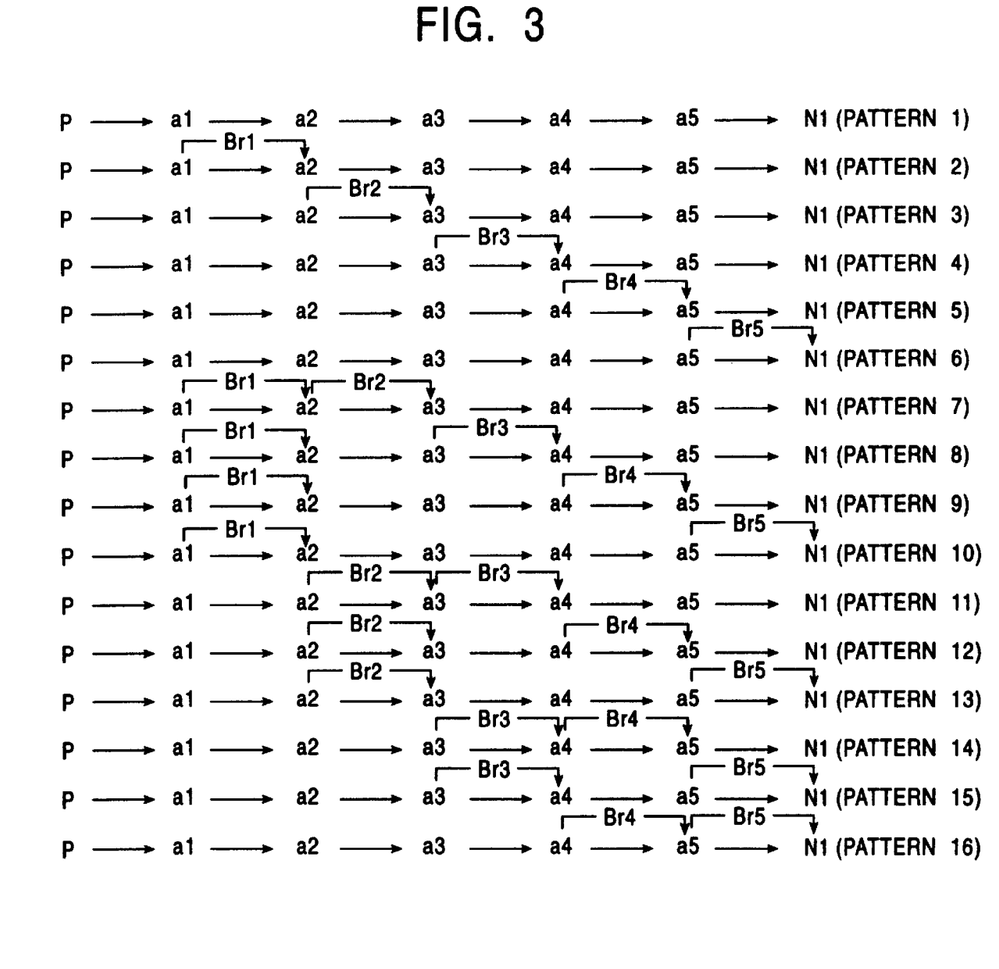
FIG. 3 is a schematic representation of a bridge pattern.
Figure 4:
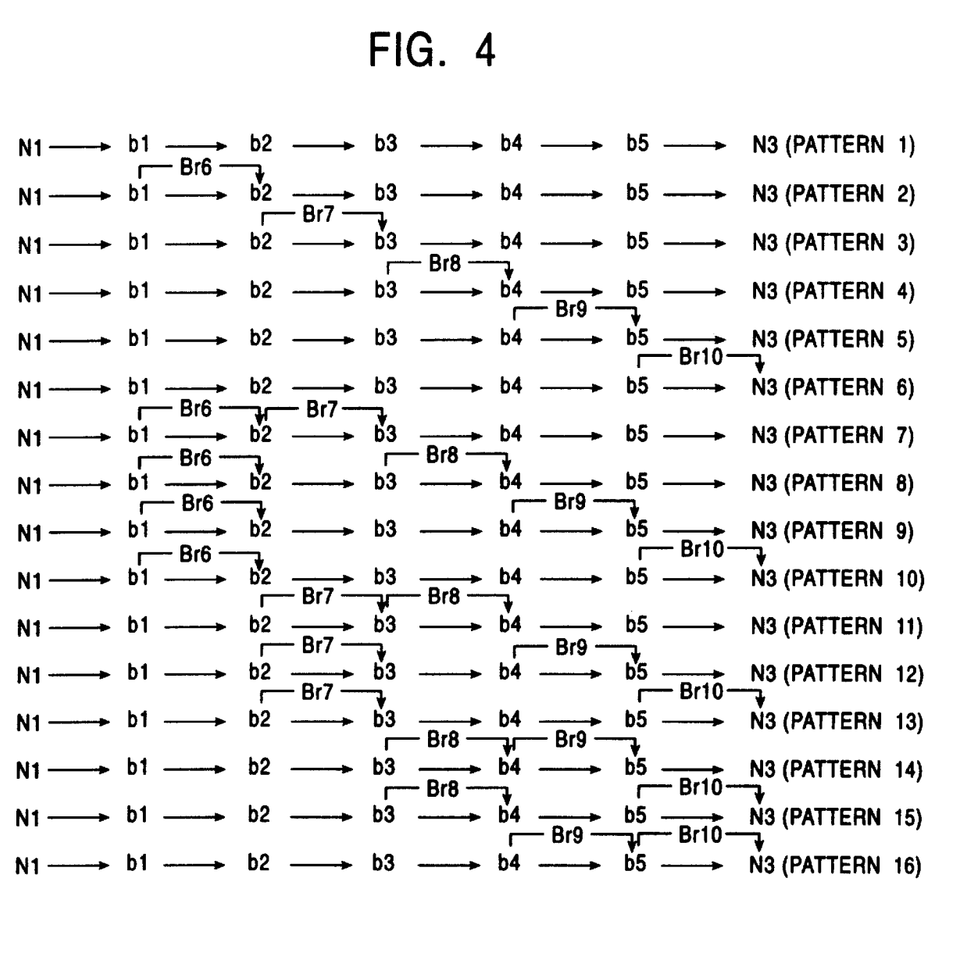
FIG. 4 is a schematic representation of a bridge pattern.
Figure 5:
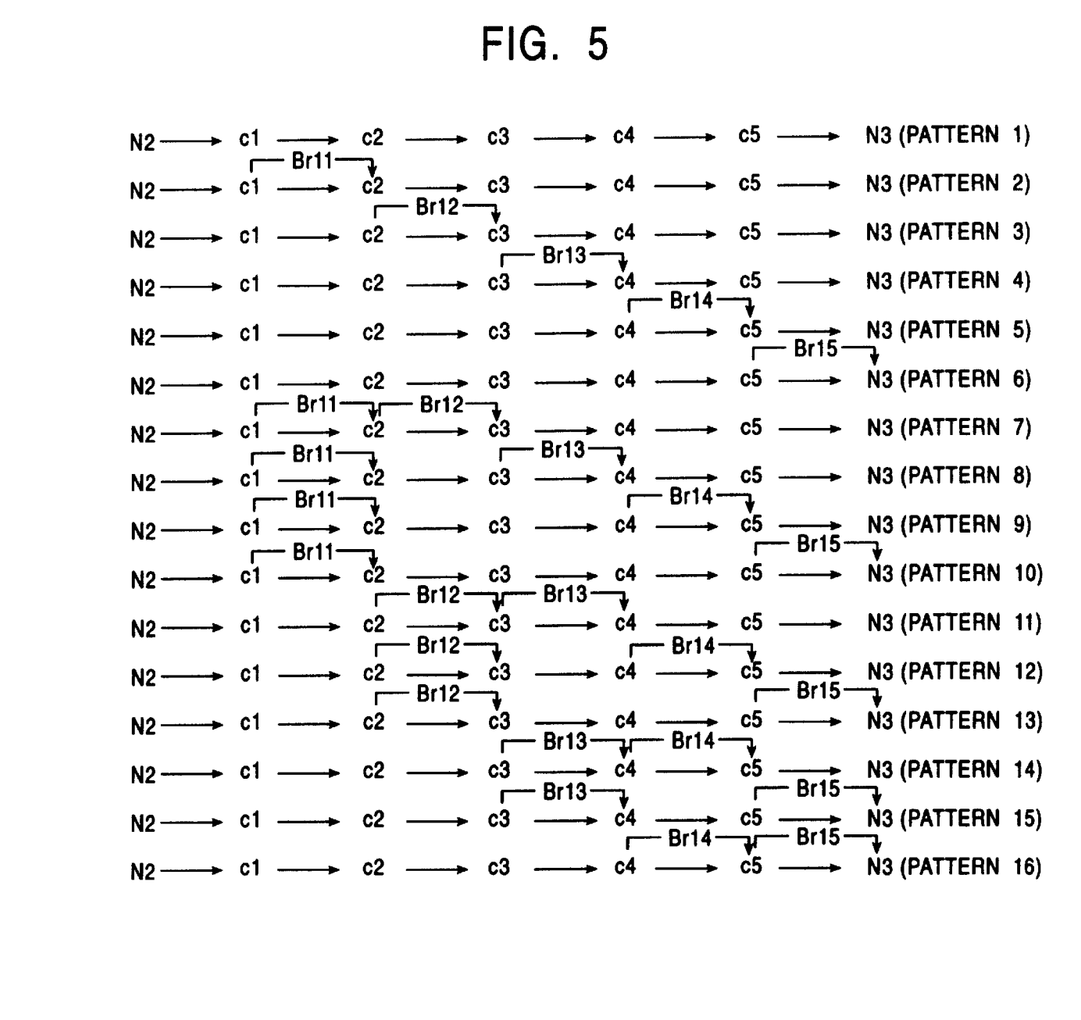
FIG. 5 is a schematic representation of a bridge pattern.
Figure 6:
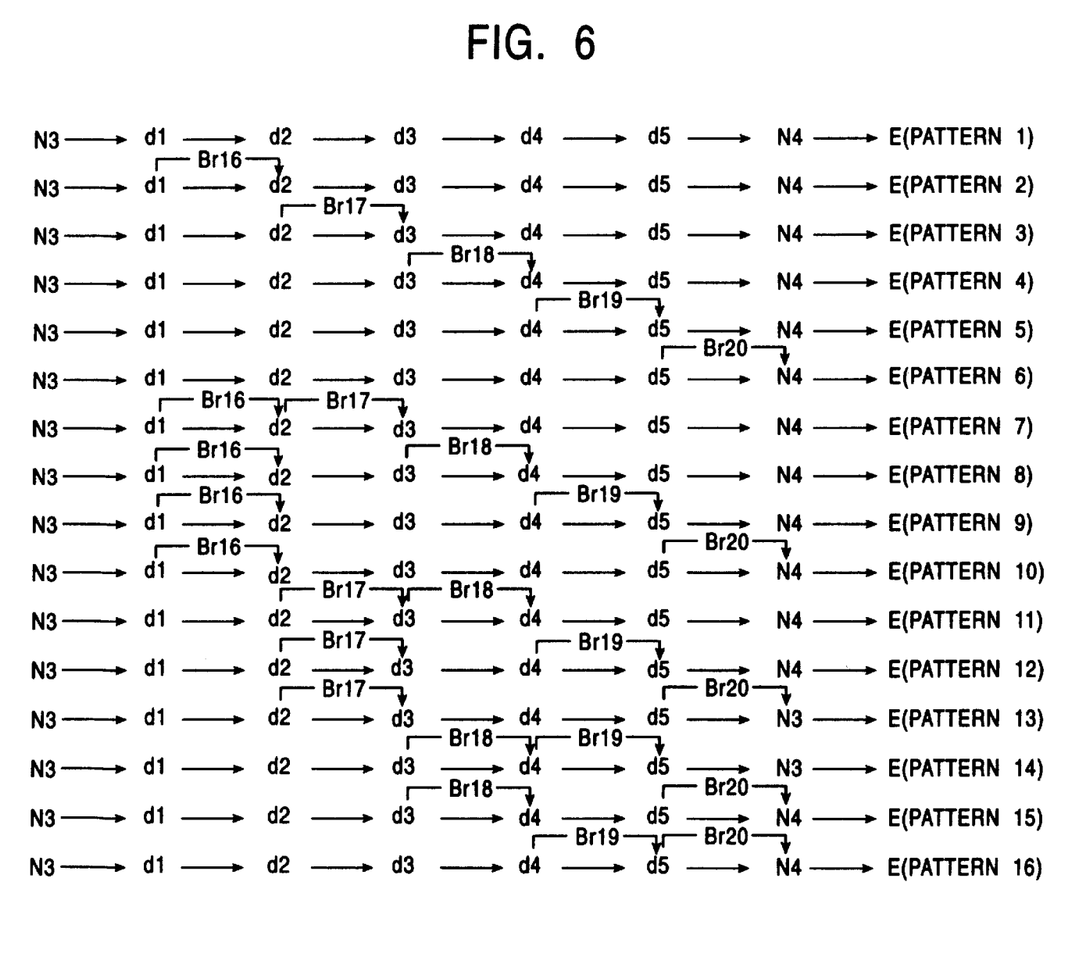
FIG. 6 is a schematic representation of a bridge pattern.

FIG. 3 illustrates bridge patterns Br1–Br5 in the step A, FIG. 4 bridge patterns Br6–Br10 in the step B, FIG. 5 bridge patterns Br11–Br15 in the step C, and FIG. 6 bridge patterns Br16–Br20 in the step D. The number of events which are allowed to be skipped, the number of events which are not allowed to be skipped, and the number of events which are required to be cleared are the same for each step A–D. Therefore, the bridge patterns in the step A are described below by way of example, and some bridge patters in steps B–D are described as required.

As described above, the game player is required to clear at least three of the skippable events a1–a5 in the step A. Therefore, as shown in FIG. 3, there are sixteen variations (patterns) in the combination of events which lead to the event N1. In these sixteen patterns, bridge patterns Br1–Br5 are used as required (patterns 2–16) except for the case where events a1–a5 are all cleared (pattern 1).

When the event a1 is skipped, the story is continued to the event a2 via the bridge pattern Br1. That is, the bridge pattern Br1 serves to connect the event P to the event a2. Similarly, when the event a2 is skipped, the bridge pattern Br2 is used to connect the event a1 to the event a3. When the event a3 is skipped, the bridge pattern Br3 is used to connect the event a2 to the event a4. On the other hand, when the event a4 is skipped, the bridge pattern Br4 is used to connect the event a3 to the event a5, and the bridge pattern Br5 is used to connect the event a4 to the event N1 when the event a5 is skipped.

Figure 7:
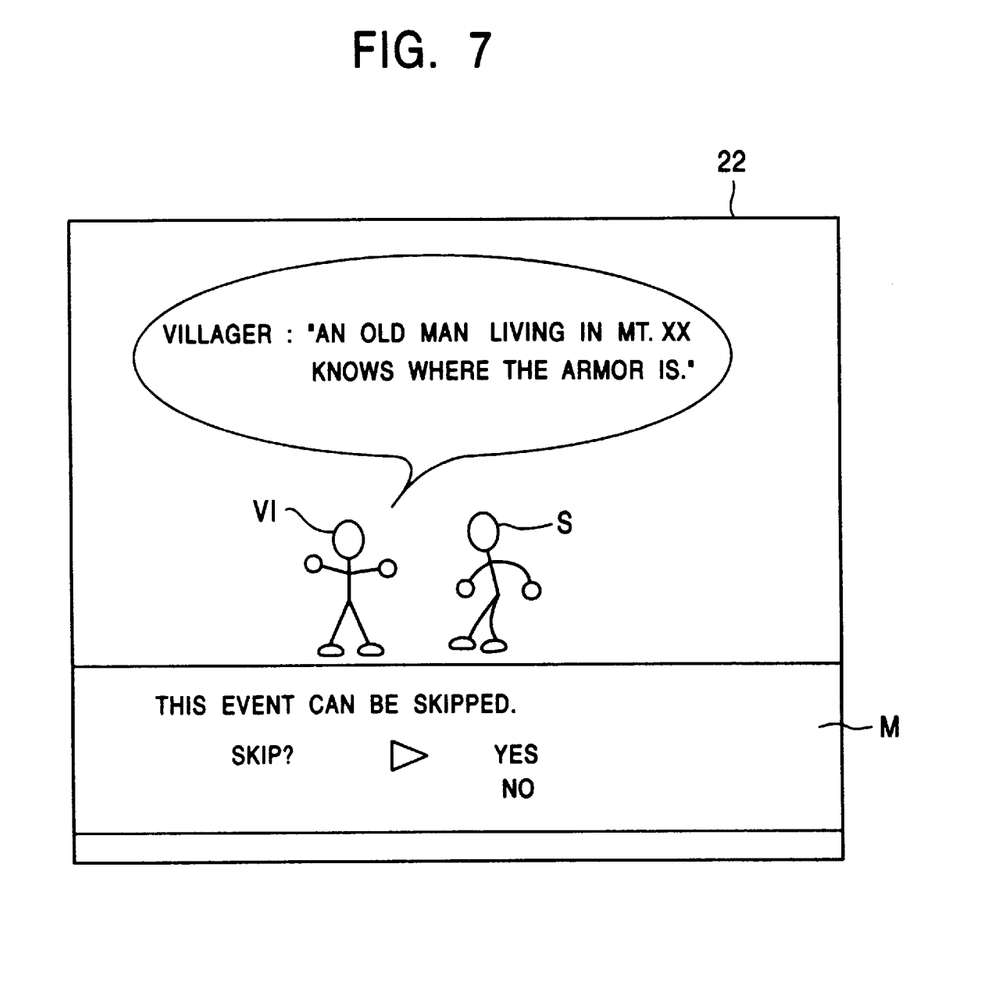
FIG. 7 is a schematic diagram illustrating an example of an image displayed on the screen of the video game machine.
Figure 8:
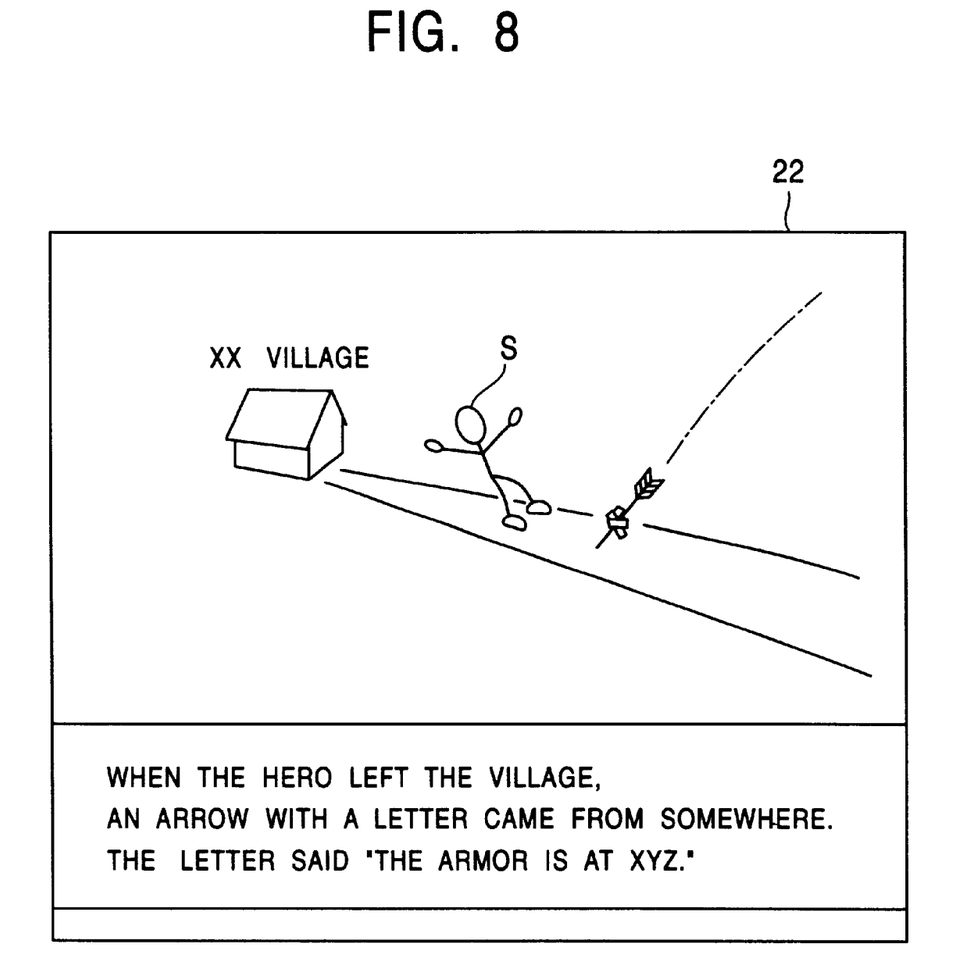
FIG. 8 is a schematic diagram illustrating an example of an image displayed on the screen of the video game machine.

FIG. 7 illustrates an example of a scene displayed on the screen at which the story may jump, in response to choice of the game player, to another event via the bridge pattern Br5 (skipping the event a5). FIG. 8 illustrates an example of a scene displayed on the screen when the bridge pattern Br5 is executed. In FIG. 7, the principal character S talks to a person V1 living in a certain village and the villager V1 tells the principal character that an old man knows where the armor is. In FIG. 7, the image displayed on the screen includes a message M saying that the event (a5) in which the principal character will call on the old man is allowed to be skipped.

If the game player selects "No", then the event a5 is presented. In this case, the principal character S leaves the village to call on the old man living in Mt. XX. In exchange for an obtained ball, the principal character S gets information, from the old man, about where the armor is. Thus the story proceeds to the event N1. On the other hand, if the game player selects "Yes" in FIG. 7, then the bridge pattern Br5 is executed. In this case, as shown in FIG. 8, when the principal character leaves the village, and an arrow with a letter comes from somewhere. From the letter, the principal character gets information where the armor is. Thus the story proceeds to the event N1.

On the other hand, if for example the event b1 (in which the principal character S searches a cave for a ring; refer to FIG. 2) is skipped in the step B, then the bridge pattern Br6 is executed as shown in FIG. 5. In the bridge pattern Br6, the principal character S is attacked by a monster. The principal character S battles against the monster and defeats the monster. The principal character S finds out the ring on the dead body of the monster wherein the ring will be found in the cave if the event b1 is executed without being skipped. After that, the story proceeds to the event b2.

On the other hand, if for example the event c4 (in which the principal character S battles against a soldier D; refer to FIG. 2) is skipped in the step C, then the bridge pattern Br14 is executed as shown in FIG. 6. In the bridge pattern Br14, the principal character S hears that the solder D died in a battle, and the story proceeds to the event c5.

In the step D, if for example the event d5 (in which the principal character S hires sailors and goes to an island shown in a map; refer to FIG. 2) is skipped, then the bridge pattern Br20 is executed as shown in FIG. 7. In the bridge pattern Br20, the principal character S goes to the island by rowing a boat by himself. On the way to the island, the principal character S encounters a storm and loses some items to reach the island. The story then proceeds to the event N4. These bridge patterns Br1–Br20 are executed in a rather short time compared to the corresponding skippable events a1–a5, b1–b5, c1–c5, and d1–d5, and the story proceeds to the next event. Each bridge pattern Br1–Br20 is an auto-event which automatically proceeds without the operation of the controller 21 performed by the game player. Alternatively, any of the bridge patterns Br1–Br20 may be set such that they proceed in response to the operation of the controller 21 performed by the game player.

Furthermore, in the RPG according to the present embodiment, the principal character S becomes stronger (greater in power level) when he wins a battle against a monster he encounters in an event. The principal character S also becomes stronger when he gets an item (such as a weapon, protector, tool, etc.) in an event.

The power of monsters the principal character S encounters in the respective events varies depending on the power (level) of the principal character S. However, the power of the monster's boss which appears in the event N4 is set to be constant regardless of the number of cleared events. The ranks of the armor, the helmet, and the sword that the principal character S gets in the events N1, N2, and N4, respectively, becomes high with the decreasing number of the skippable events cleared in the steps A–C.

Operation of the Video Game Machine

The operating process performed by the video game machine during the RPG is described below. As described above, the RPG according to the present embodiment is executed by the CPU 1 by executing the game program loaded in the main memory 5. In the execution of the game program, data associated with the respective events P, a1–a5, b1–b5, c1–c5, d1–d5, N1–N4, and E are stored in the main memory 5, and an event management table 5a and a state management table 5b are created in the main memory.

Figure 9A:
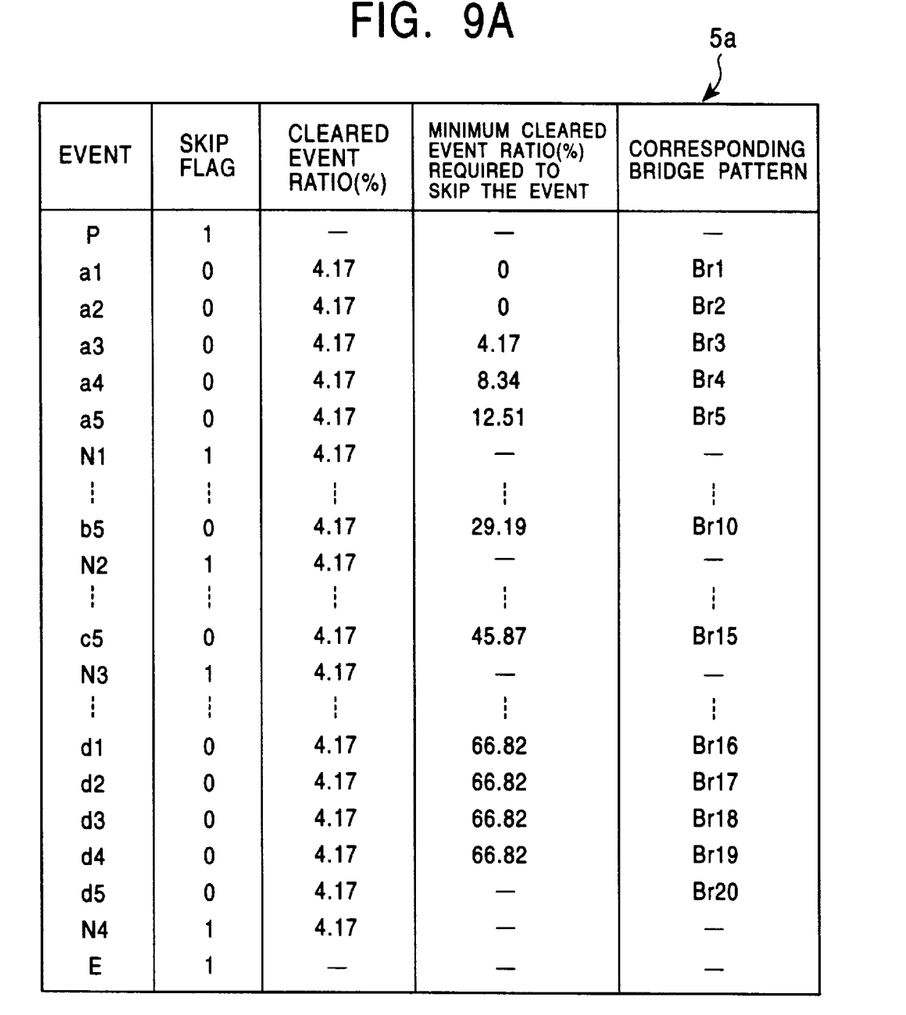
FIG. 9 is a schematic representation of an event management table and a state management table.
Figure 9B:
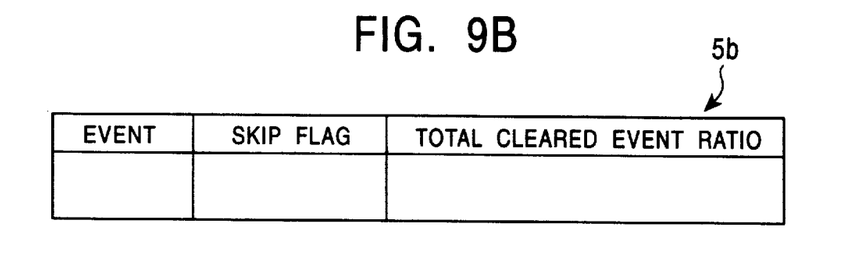

FIG. 9A illustrates the event management table 5a, and FIG. 9B illustrates the state management table 5b. In FIG. 9A, the event management table 5a stores the data of the plurality of events presented in the RPG, skip flags indicating whether the respective events are allowed to be skipped or not, the cleared event ratio representing the relative number of cleared events, the minimum cleared event ratios required to skip the respective events, and the data representing the bridge patterns corresponding to the skipped events. Events are allowed to be skipped if the value of the corresponding skip flags is equal to 0, and events are not allowed to be skipped if the value of the corresponding skip flags is equal to 1.

On the other hand, as shown in FIG. 9B, the state management table 5b stores the data indicating which event should be presented to the game player, the skip flag corresponding to that event, and the total cleared event ratio indicating the cumulative number of events cleared by the game player. In the case where no events are cleared by the game player, the total cleared event ratio of the state management table 5b is 0.

Figure 10:
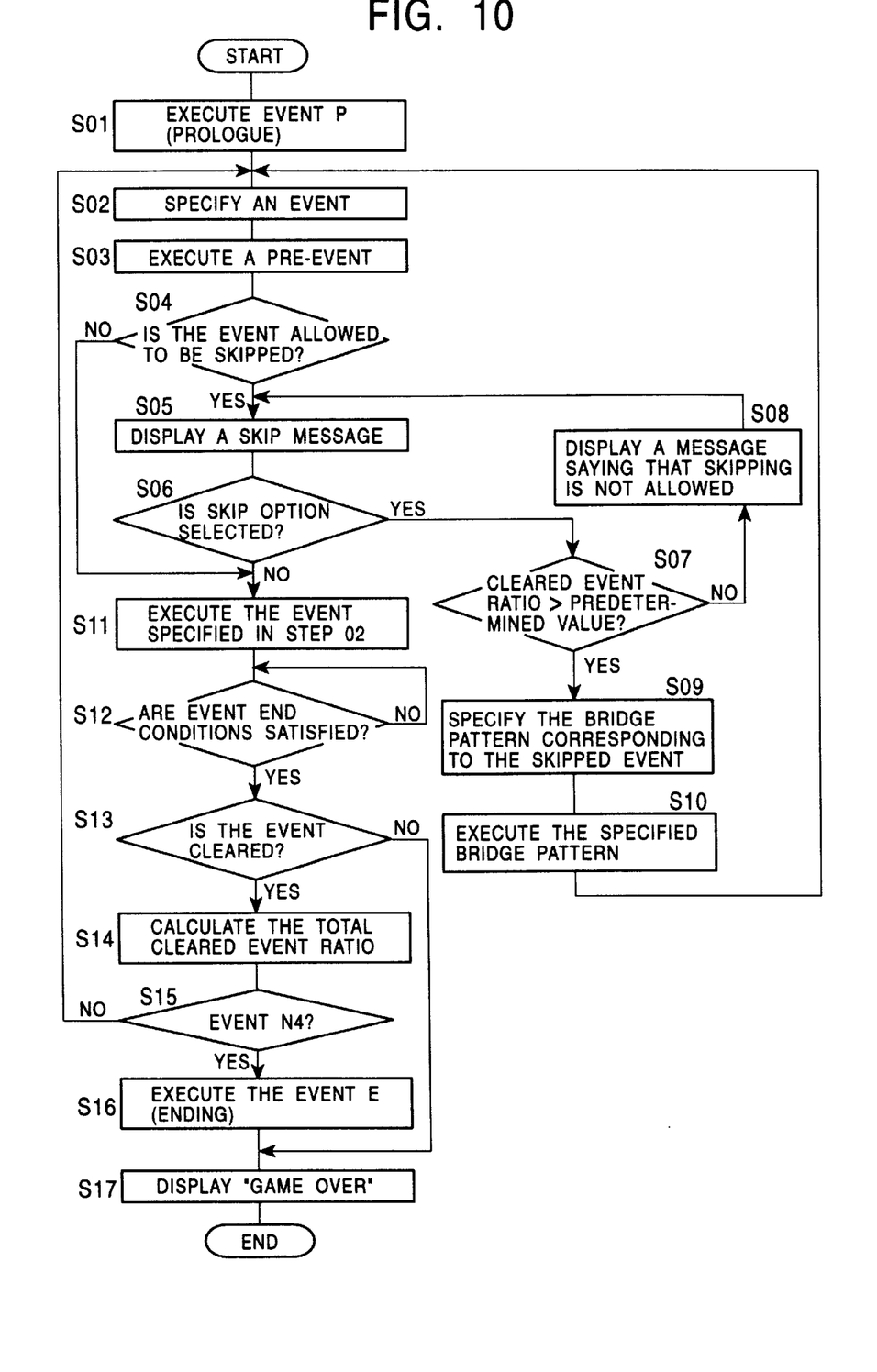
FIG. 10 is a flowchart illustrating the process performed by the video game machine.

FIG. 10 is a flowchart illustrating the process performed by the CPU1 when the video game machine executes the RPG. After the electric power of the video game machine is turned on, when a starting image (not shown in the figure) is displayed on the television monitor 22 in accordance with the game program performed by the CPU 1, if the game player presses the start button 21b of the controller 21, then the process starts.

In FIG. 10, the CPU 1 first executes the event P (step S01), in which an image representing the prologue of the RPG (in which the principal character S leaves his hometown) is displayed on the television monitor 22. The CPU1 advances the process to step S02.

In step S02, the CPU 1 specifies the event which should be executed next according to the predetermined event execution order (event presentation order). The CPU1 reads the data indicating the event which should be executed next and the corresponding skip flag from the event management table, and stores the data into the state management table 5b. The CPU1 then advances the process to step S03.

The CPU1 retrieves the data indicating the event to be executed next from the state management table 5b and executes the pre-event corresponding to that event (thereby presenting an event in which the game player can advance the story so that the condition required for the following event to occur is satisfied) (step S03). For example, as shown in FIG. 7, the CPU 1 presents an event in which a villager v1 provides information associated with the event to the principal character S. The CPU1 then advances the process to step S04.

In step S04, the CPU1 determines whether the event is allowed to be skipped on the basis of the corresponding skip flag stored in the state management table 5b (step S04). If the value of the skip flag is 1 (that is, the result in step S04 is "No"), then the CPU 1 determines that the next event is not allowed to be skipped, and the CPU 1 advances the process to step S11. On the other hand, if the value of the skip flag is 0 (that is, the result in step S04 is "Yes"), then the CPU 1 determines that the next event is allowed to be skipped, and the CPU 1 advances the process to step S05.

In step S05, the CPU 1 displays a message M saying that the next event is allowed to be skipped on the screen of the television monitor 22 in the pre-event. In the specific example shown in FIG. 7, the message says "This event can be skipped. Do you like to skip the event? Yes/No." The CPU 1 waits for the game player to enter a selection signal (indicating either "Yes" or "No") via the controller 21. If any signal is input, then the CPU 1 advances the process to step S06.

In step S06, if the signal input in step S05 is "Yes" (event skip signal indicating that the event should be skipped), then the CPU 1 advances the process to step S07. Conversely, if the signal input in step S05 is "No" (event execution signal indicating that the event should be executed without being skipped), then the CPU 1 advances the process to step S11.

On the other hand, in the case where the process has been advanced to step S07, the CPU 1 reads the minimum cleared event ratio (predefined threshold value) required to skip the event from the event management table 5a and also reads the total cleared event ratio from the state management table 5b. The CPU 1 compares these two values to each other and determines whether the total cleared event ratio is greater than the predefined threshold value. If it is determined that the total cleared event ratio is not greater than the predetermined threshold value, then the CPU 1 displays a message saying that the event is not allowed to be skipped on the television monitor 22 (step S08). After that, the CPU 1 returns the process to step S05. On the other hand, if it is determined in step S07 that the total cleared event ratio is greater than the predetermined threshold value, then the CPU 1 advances the process to step S09.

When the process has been advanced to step S09, the CPU 1 specifies a bridge pattern corresponding to the skipped event. That is, the CPU 1 reads the data indicating the bridge pattern corresponding to the skipped event from the event management table 5a, and executes the bridge pattern in accordance with the bridge pattern data read from the event management table 5a (step S10). Thus, in the case where for example the event a5 is skipped, the bridge pattern Br5 shown in FIG. 8 is presented to the game player. After completion of the process in step S10, the CPU 1 returns the process to step S02.

On the other hand, when the process has been advanced to step S11, the CPU 1 executes the event specified in step S02 thereby presenting the specified event to the game player. If the game player succeeds in clearing the event by properly operating the principal character S, the CPU 1 advances the process to step S12.

In step S12, the CPU1 judges whether the event executed in step S11 is completed. That is, the CPU1 determines whether the predefined event end condition is satisfied. If the CPU 1 determines that the event end condition is not satisfied (that is, the result in step S12 is "No"), then the CPU 1 performs the process in step S12 repeatedly until step S12 concludes that the event end condition is satisfied. If the CPU 1 determines in step S12 that the event end condition is satisfied, then the CPU advances the process to step S13. In the above process, the event end condition is satisfied when the event clear condition is satisfied as a result of the operation of the principal character S performed by the game player or when the power parameter of the principal character S becomes 0 (zero).

In the case where the process has been advanced to step S13, the CPU 1 determines whether the event end condition is determined to be satisfied in step S12 because of the satisfaction of the event clear condition. If it is determined that the event clear condition is satisfied, then the CPU 1 advances the process to step S13. On the other hand, if it is determined in step S13 that the event clear condition is not satisfied, then the CPU 1 determines that the power parameter of the principal character S has become 0 (zero), that is, the principal character S died. In this case, the CPU 1 advances the process to step S17.

In the case where the process has been advanced to step S14, the CPU 1 reads the cleared event ratio corresponding to the cleared event from the event management table 5, and also reads the total cleared event ratio from the state management table 5. The CPU 1 adds together these two values, and stores (overwrite) the resultant value as the total cleared event ratio into the state management table 5b. The CPU1 then advances the process to step S15.

In step S15, the CPU1 determines whether the event data stored in the state management table 5b is concerned with the event N4. If it is determined that the data is concerned with the event N4, then the CPU1 advances the process to step S16. On the other hand, if it is determined that the data is not concerned with the event N4, then the CPU1 returns the process to step S02, and performs steps from S02 to S15 repeatedly until "Yes" is obtained in step S15.

Thus the events a2–a5, b1–b5, c1–c5, d1–d5, and N1–N4 in the respective steps A–D shown in FIG. 2 are presented one by one to the game player, and the game player clears these events while skipping some events thereby developing the story toward the ending.

In the case where the process has been advanced to step S16, the CPU1 executes the event E thereby displaying the ending (epilogue) on the screen of the television monitor 22. The CPU1 then advances the process to step S17.

In step S17, the CPU 1 displays a string "Game Over" on the television monitor 22. After completion of step S17, the execution of the entire RPG by the video game machine is complete.

As can be understood from the above description, the present invention has various advantages. That is, in the present invention, the plurality of events forming the story of the RPG include skippable events a1–a5, b1–b5, c1–c5, and d1–d5 so that the game player can develop the game story in the RPG with properly selected events. This makes it possible to reduce the length of the story of the RPG as desired. That is, it is possible to reduce the number of events required for the game player to clear before reaching the ending, and thus the time spent by the game player to reach the ending of the story is reduced. This allows a lot of people including those who do not have enough time to enjoy the RPG with the conventional vide game machine to attract the RPG video game machine of the present invention.

Furthermore, in the present invention, it is possible to advance the story in various ways along a path selected from 16 patterns prepared in the respective steps A–D. Thus, when the game player reaches the ending of the story, he/she becomes interested in playing the game in a different way.

Furthermore, to skip any of the events a1–a5, b1–b5, c1–c5, and d1–d5, the game player is required to have achieved the minimum cleared event ratio defined for the corresponding event. If the cleared event ratio is not greater than the minimum cleared event ratio, the event is not allowed to be skipped. Therefore, even in the case where the game player skips as many events as possible, the principal character S can become strong enough, by the time at which the story enters the event N4, to conquer the monster's boss. This allows the game player to advance the story to the ending even in the case the story reaches the event N4 after clearing the minimum number of events. That is, it is possible to set the degree of difficulty in playing the RPG within a certain desirable range regardless of the length of the story. Furthermore, the game player can understand the outline of the story even when the minimum number of events are selected.

Still furthermore, even if any of skippable events a1–a5, b1–b5, c1–c5, and d1–d5 is skipped, no contradiction or trouble in proceeding the game occurs because bridge patterns Br1–Br20 corresponding to the skipped events are executed. The execution of bridge patterns Br1–Br20 may result in some modification in the story which does not occur if the event is not skipped. This modification in the story makes the game player interested in playing the RPG again after reaching the ending of the story. Thus, the video game machine according to the present invention provides an attractive RPG to the game player.

Although the present invention has been described above with reference to an embodiment in which the invention is applied to an RPG video game machine, the invention may also be applied to a wide variety of video game machine such as an adventure game, simulation game, shooting game, shooting game having a certain story, etc. Furthermore, it has been assumed that the RPG video game machine is of the personal type, the invention may also be applied to an RPG video game machine for use in an amusement arcade.

In conclusion, the present invention provides a video game machine capable of presenting an attractive RPG that many people including those who do not have enough time can enjoy. The present invention also provides a machine readable storage medium storing a computer program for use by such a video game machine.

What is claimed is:

1. A video game machine for presenting a plurality of events, which form a story in a game world and which are related to its ending, to a game player so that said game player can develop the story toward its ending via clearing the events by means of operating a character appearing in the story, said video game machine comprising:

event data storage means for storing the plurality of data each of which corresponds to one of said plurality of events respectively;

specifying means for specifying one of said plurality of events, judgment means for reading the data of the event specified by said specifying means from said event data storage means and judging whether said event is allowed to be skipped or not on the basis of the data of said event; and event cancel means for canceling the presentation of said event to the game player in response to an input of an event skip signal, provided that said judgement means has judged that said event is allowed to be skipped.

2. A video game machine according to claim 1, further comprising cleared event ratio storage means for storing cleared event ratio data indicating how many of said plurality of events have been cleared, wherein in response to said event skip signal, said event cancel means cancels the presentation of the event judged by said judgement means as being allowed to be skipped, provided that the cleared event ratio data stored in said cleared event ratio storage means is greater than a predetermined threshold value.

3. A video game machine according to claim 1, further comprising connection event presentation means for presenting a connection event when the presentation of an event is canceled by said event cancel means, so that the event immediately prior to said canceled event is connected to the event following said canceled event via said connection event.

4. A video game machine for presenting a plurality of events, which form a story in a game world and which are related to its ending, to a game player one by one in a predetermined presentation order so that said game player can develop the story toward its ending via clearing the events by means of operating a character appearing in the story, said video game machine comprising:

event data storage means for storing the plurality of data each of which corresponds to one of said plurality of events respectively;

specifying means for specifying one of said plurality of events in accordance with said predetermined presentation order;

judgment means for reading the data of the event specified by said specifying means from said event data storage means and judging whether said event is allowed to be skipped or not on the basis of the data of said event; and event cancel means for canceling the presentation of said event to the game player in response to an input of an event skip signal, provided that said judgement means has judged that said event is allowed to be skipped.

5. A video game machine according to claim 4, further comprising cleared event ratio storage means for storing cleared event ratio data indicating how many of said plurality of events have been cleared, wherein in response to said event skip signal, said event cancel means cancels the presentation of the event judged by said judgement means as being allowed to be skipped, provided that the cleared event ratio data stored in said cleared event ratio storage means is greater than a predetermined threshold value.

6. A video game machine according to claim 5, further comprising connection event presentation means for presenting a connection event when the presentation of an event is canceled by said event cancel means, so that the event immediately prior to said canceled event is connected to the event following said canceled event via said connection event.

7. A video game machine according to claim 5, further comprising threshold value storage means for storing said plurality of threshold values each of which corresponds to one of said plurality of events respectively, wherein in response to said event skip signal, said event cancel means cancels the presentation of the event judged by said judgement means as being allowed to be skipped, based on said threshold value stored in said threshold value storage means.

8. A video game machine according to claim 7, wherein said threshold values stored in said threshold value storage means are determined in accordance with said event presentation order.

9. A video game machine according to claim 4, further comprising connection event presentation means for presenting a connection event when the presentation of an event is canceled by said event cancel means, so that the event immediately prior to said canceled event is connected to the event following said canceled event via said connection event.

10. A video game machine according to claim 4, wherein said data of the plurality of events stored in said event data storage means include skip permission data indicating whether said events are allowed to be skipped or not, and said judgement means judges whether said event is allowed to be skipped or not on the basis of said skip permission data.

11. A video game machine according to claim 10, wherein said skip permission data is determined in accordance with said event presentation order.

12. A machine readable storage medium storing a computer program for use by a video game machine to present a plurality of events, which form a story in a game world and which are related to its ending, to a game player so that said game player can develop the story toward its ending via clearing the events by means of operating a character appearing in the story, said computer program being adapted to make a computer execute the process comprising the steps of:

reading one of a plurality of data each of which corresponds to one of said plurality of events respectively;

determining whether said event is allowed to be skipped on the basis of said data of the event; and in response to an input of an event skip signal, canceling the presentation of said event to the game player, provided that said event has been determined to be allowed to be skipped.

13. A machine readable storage medium storing a computer program for use by a video game machine to present a plurality of events, which form a story in a game world and which are related to its ending, to a game player one by one in a predetermined presentation order so that said game player can develop the story toward its ending via clearing the events by means of operating a character appearing in the story, said computer program being adapted to make a computer execute the process comprising the steps of:

specifying one of said plurality of events in accordance with said predetermined presentation order and reading the data which corresponds to said specified event;

determining whether said specified event is allowed to be skipped on the basis of said data of the specified event;

in response to an input of an event skip signal, canceling the presentation of said event to the game player, provided that said specified event has been determined to be allowed to be skipped.

14. A machine readable storage medium storing a computer program, according to claim 13, wherein said computer program further comprising the steps of reading cleared event ratio data indicating how many of said plurality of events have been cleared; reading the threshold value corresponding to the specified event; and comparing said cleared event ratio data to said threshold value, and wherein in said event canceling step the presentation of said event is canceled in response to an input of an event skip signal, provided that said event has been determined to be allowed to be skipped, and provided that said cleared event ratio data is greater than said threshold value.

15. A machine readable storage medium storing a computer program, according to claim 14, wherein said computer program further comprising the step of presenting a connection event when the presentation of an event is canceled so that the event immediately prior to said canceled event is connected to the event immediately following said canceled event via said connection event.

16. A method of selecting an event in a video game machine for presenting a plurality of events, which form a story in a game world and which are related to its ending, to a game player so that said game player can develop the story toward its ending via clearing the events by means of operating a character appearing in the story, said method comprising the steps of:

reading one of a plurality of data each of which corresponds to one of said plurality of events respectively;

determining whether said event is allowed to be skipped on the basis of said data of the event; and, in response to an input of an event skip signal, canceling the presentation of said event to the game player, provided that said event has been determined to be allowed to be skipped.

17. A method of selecting an event in a video game machine for presenting a plurality of events, which form a story in a game world and which are related to its ending, to a game player one by one in a predetermined presentation order so that said game player can develop the story toward its ending via clearing the events by means of operating a character appearing in the story, said method comprising the steps of:

specifying one of said plurality of events in accordance with said predetermined presentation order and reading the data which corresponds to said specified event;

determining whether said specified event is allowed to be skipped on the basis of said data of the event; and canceling the presentation of said event to the game player in response to an input of an event skip signal, provided that said specified event has been determined to be allowed to be skipped.

18. A method of selecting an event in a video game machine, according to claim 17, further comprising the steps of reading cleared event ratio data indicating how many of said plurality of events have been cleared; reading the threshold value corresponding to the specified event; and comparing said cleared event ratio data to said threshold value, wherein in said event canceling step the presentation of said event is canceled in response to an input of an event skip signal, provided that said event has been determined to be allowed to be skipped, and provided that said cleared event ratio data is greater than said threshold value.

19. A method of selecting an event in a video game machine, according to claim 18, further comprising the step of presenting a connection event when the presentation of an event is canceled so that the event immediately prior to said canceled event is connected to the event immediately following said canceled event via said connection event.

* * * * *